(12) United States Patent
Chen et al.

(10) Patent No.: US 7,639,505 B2
(45) Date of Patent: Dec. 29, 2009

(54) COMPUTER ENCLOSURE

(75) Inventors: Yun-Lung Chen, Tu-Cheng (TW); Quan-Guang Du, Shenzhen (CN); Li Tong, Shenzhen (CN); You-He Ke, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 639 days.

(21) Appl. No.: 11/313,408

(22) Filed: Dec. 20, 2005

(65) Prior Publication Data

US 2007/0025093 A1    Feb. 1, 2007

(30) Foreign Application Priority Data

Jul. 29, 2005    (CN)    .................... 2005 2 0062295 U

(51) Int. Cl.
*H05K 7/14*    (2006.01)
(52) U.S. Cl. .................. 361/724; 361/679.02; 361/725; 312/223.1; 312/223.2
(58) Field of Classification Search ......... 361/679–686, 361/724–727; 312/223.1, 223.2
See application file for complete search history.

(56) References Cited

U.S. PATENT DOCUMENTS 2,584,173 A * 2/1952 Fowler ........................ 312/303
3,014,160 A * 12/1961 Brogden ...................... 361/727
3,048,747 A * 8/1962 Errichiello ................... 361/730
4,447,858 A * 5/1984 Farag et al. .................. 361/829
4,939,622 A * 7/1990 Weiss et al. .................. 361/727
5,224,019 A * 6/1993 Wong et al. .................. 361/685
5,338,214 A * 8/1994 Steffes et al. ................ 439/160
5,349,132 A * 9/1994 Miller et al. ................. 174/372
5,460,441 A * 10/1995 Hastings et al. ............. 312/298
5,661,630 A * 8/1997 Levins et al. ................ 361/683
5,971,506 A * 10/1999 Dubin ....................... 312/223.2
5,978,232 A * 11/1999 Jo .............................. 361/796
5,980,003 A * 11/1999 Huang ....................... 312/223.2
6,104,616 A * 8/2000 Benson et al. ............... 361/724
6,120,118 A    9/2000 Dean
6,141,209 A * 10/2000 Kerrigan et al. ............. 361/683
6,544,052 B1 * 4/2003 Schwartz .................... 439/152
6,665,189 B1 * 12/2003 Lebo .......................... 361/730
6,961,236 B1 * 11/2005 Chao .......................... 361/683
7,423,883 B2 * 9/2008 Carlson et al. .............. 361/724

* cited by examiner

Primary Examiner—Jayprakash N Gandhi
Assistant Examiner—Anthony Q Edwards
(74) Attorney, Agent, or Firm—D. Austin Bonderer

(57) ABSTRACT

A computer enclosure includes a chassis (10) and a carrying bracket (30,50) received in the chassis (10). The chassis (10) includes a bottom wall (11) and a rear wall (13) defining an opening (133). The carrying bracket (30,50) includes a base wall (31,51) mounted on the bottom wall (11) of the chassis (10) and a side wall (33,53) perpendicular to the base wall (31,51). The side wall (33,53) of the carrying bracket (30,50) is coupled to the opening (133) of the chassis (10). When users need to replace their motherboard with another type it is easy do so merely by replacing the carrying bracket with the appropriate one for the new motherboard, rather than replacing the whole computer enclosure.

18 Claims, 4 Drawing Sheets

COMPUTER ENCLOSURE

BACKGROUND OF THE INVENTION

1. Field of the Invention

The present invention relates to computer enclosures, and more particularly to a computer enclosure adapted to receive different types of motherboards.

2. General Background

A computer generally includes a motherboard installed. A plurality of components such as a CPU and a variety of input/output connectors are installed on the motherboard, and a reasonable configuration of these components on the motherboard can enhance the quality of the computer. Conventional computers generally use ATX (Advanced Technology Extended) type motherboards. So far, the ATX type motherboard is produced by most motherboard manufacturers.

With the development and progress of the computer industry, the CPUs in some computers needs to process a mass of information and produce much more heat than before. In a conventional ATX type motherboard, the CPU is disposed on a rear portion of the motherboard near to a rear panel of the computer enclosure. The airflow for cooling the components in the computer enters from the front portion of the enclosure and flows out from the rear portion. But the hard disk, the graphics card, and the north bridge on the motherboard all produce a great deal of heat. Even with the help of a fan, the cooling airflow is warmed after flowing past the other components in the computer before reaching the CPU. Therefore, a BTX (Balanced Technology Extended) type motherboard appears in the industry with the CPU in a front position of the computer enclosure, and the memory bank rotates to a position perpendicular to the original state in the ATX type computer allowing for the airflow to cool the CPU before passing on to the other components. However, the positions of the components disposed on the BTX type motherboard are different from on the ATX type motherboard, the computer enclosure built for the ATX type motherboard cannot accommodate the BTX type motherboard. When users need to alternate between ATX and BTX motherboards, they must change to another computer enclosure as well. This is a waste of money and material.

Accordingly, what is needed is a computer enclosure able to accommodate different types of motherboards.

SUMMARY

A computer enclosure includes a chassis and a carrying bracket received in the chassis. The chassis includes a bottom wall and a rear wall defining an opening. The carrying bracket includes a base wall mounted on the bottom wall of the chassis and a side wall perpendicular to the base wall. The side wall of the carrying bracket is coupled to the opening of the chassis to form a part of the rear wall of the chassis. When users need to replace their motherboard with another type, it is easy to do so merely by replacing the carrying bracket with the appropriate one for the new motherboard, rather than replacing the whole computer enclosure.

Other objects, advantages, and novel features of the present invention will be drawn from the following detailed description of preferred embodiments of the present invention with the attached drawings, in which:

DETAILED DESCRIPTION OF THE PREFERRED EMBODIMENT

Figure 1:
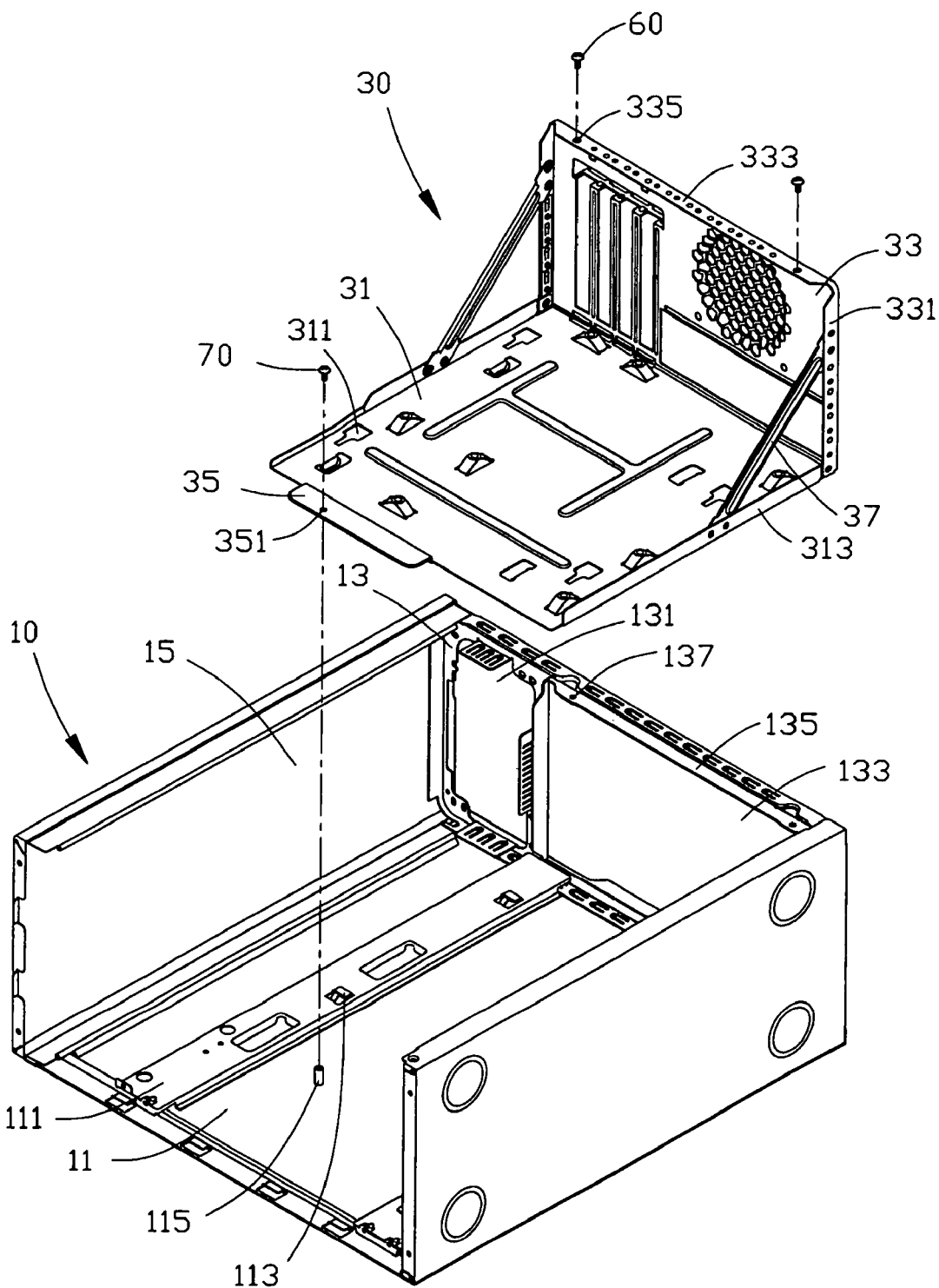
FIG. 1 is an exploded, isometric view of a chassis and an ATX type carrying bracket of a computer enclosure in accordance with a preferred embodiment of the present invention.
Figure 2:
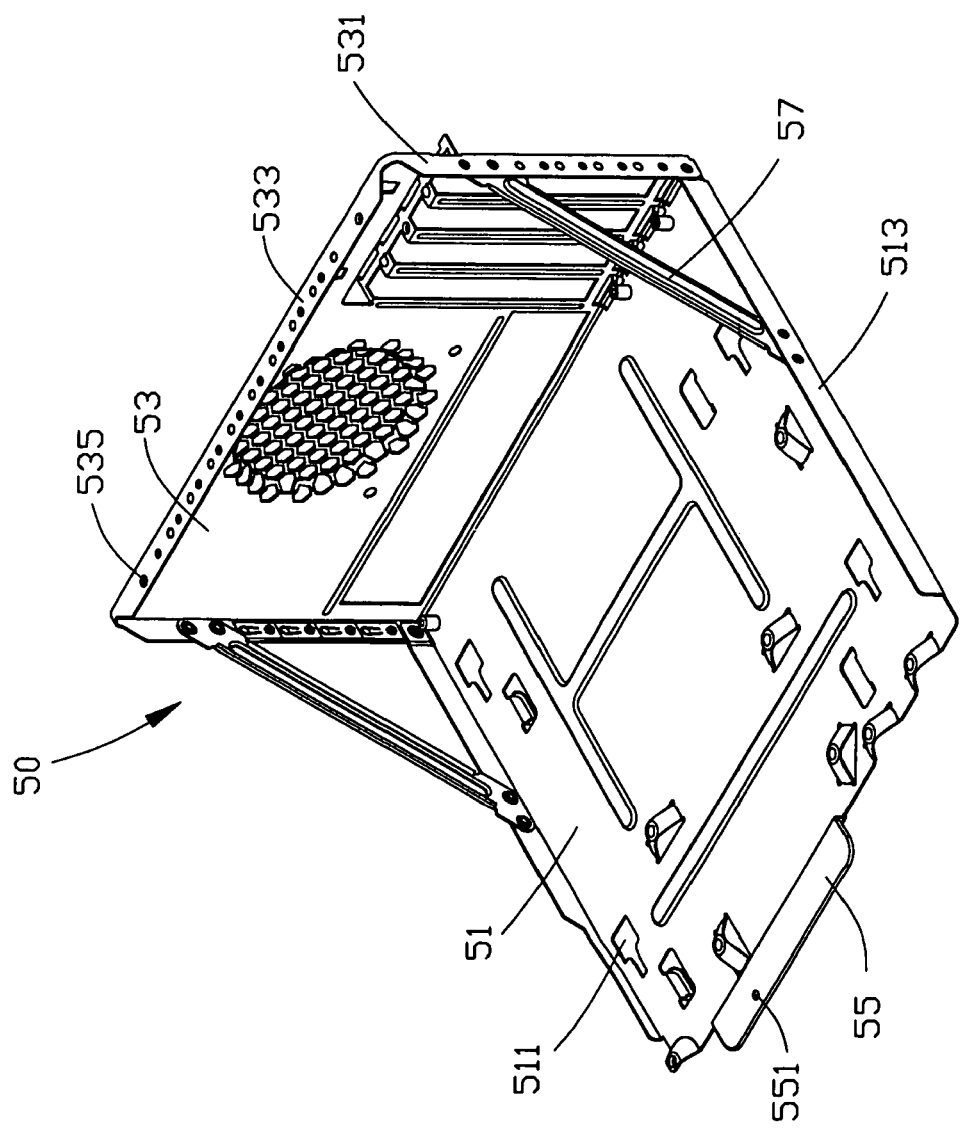
FIG. 2 is a perspective view of a BTX type carrying bracket.

Referring to FIGS. 1 and 2, an enclosure of an electronic device like a computer in accordance with a preferred embodiment of the present invention includes a chassis 10 and a ATX carrying bracket 30 or a BTX carrying bracket 50 (FIG. 1 illustrates an ATX carrying bracket).

The chassis 10 includes a bottom wall 11, and a rear wall 13 having two spaced openings 131, 133, and a pair of opposite side walls 15 perpendicular to the bottom wall 10 and the rear wall 13. A pair of beam 111 is disposed on the bottom wall 11. A plurality of securing members 113 is respectively formed in the beams 111. A securing cylinder 115 with a screw hole protrudes from the bottom wall 11 between the beams 111. A flange 135 defining a pair of securing holes 137 extends inward from an upper edge of the opening 133.

The ATX type carrying bracket 30 includes a base wall 31 and a side wall 33 perpendicular to the base wall 31. An L-shaped handle 35 extends out from an edge opposite to the side wall 33, and a securing hole 351 is defined in the handle 35 corresponding to the screw hole of the securing cylinder 115 of the chassis 10. A plurality of securing openings 311 is defined in the base wall 31 of the carrying bracket 30 for the securing members 113 engaging therein. A pair of flanges 313 extends upwardly from two side edges of the base wall 31, and a pair of flanges 331 extends inward from two side edges of the side wall 33. A declining bar 37 is connected between each flange 313 and 331, for strengthening the carrying bracket 30. A flange 333 extends inward from a top edge of the side wall 33, defining a pair of securing holes 335 corresponding to the securing holes 137 of the chassis 10. A plurality of installing slots is defined in the side wall 33 of the carrying bracket 30 for receiving the components of the ATX motherboard.

The BTX type carrying bracket 50 includes a base wall 51 and a side wall 53 perpendicular to the base wall 51. An L-shaped handle 55 extends out from an edge opposite to the side wall 53, and a securing hole 551 is defined in the handle 55 corresponding to the securing cylinder 115 of the chassis 10. A plurality of securing openings 511 is defined in the base wall 51 of the carrying bracket 50 for the securing members 113 engaging therein. A pair of flanges 513 extends upward from two side edges of the base wall 51, and a pair of flanges 531 extends inward from two side edges of the side wall 53. A declining bar 57 is connected between each flange 513 and 531, for strengthening the carrying bracket 50. A flange 533 extends inward from a top edge of the side wall 53, defining a pair of securing holes 535 corresponding to the securing holes 137 of the chassis 10. A plurality of installing slots is defined in the side wall 53 of the carrying bracket 50 for receiving the components of the BTX motherboard.

Figure 3:
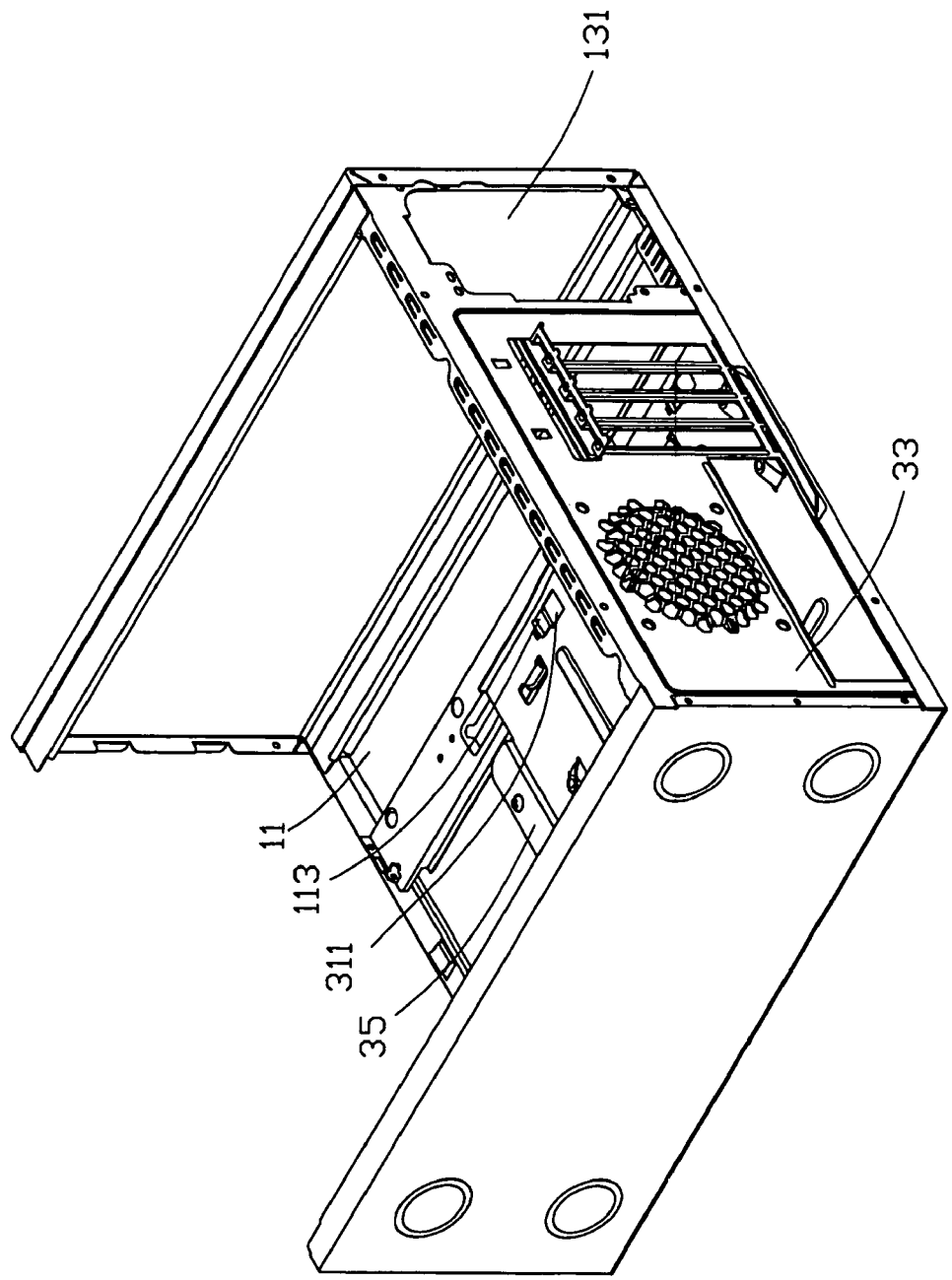
FIG. 3 is an assembled view of the computer enclosure with an ATX carrying bracket.

Referring also to FIG. 3, in assembly, the securing openings 311 of the ATX carrying bracket 30 are aligned with the securing members 113. Then, the ATX carrying bracket 30 is pushed rearward to force the securing members 113 to engage in the securing openings 311. Thereby the ATX carrying bracket 30 is received in the chassis 10, and the side wall 31 is coupled to the opening 133, to form a part of the rear wall 13 of the chassis 10. At the same time, the flange 135 of the chassis 10 overlaps the flange 333 of the ATX carrying bracket 30. The securing holes 137 of the flange 135 are in alignment with the securing holes 335 of the flange 333, and the securing hole 351 of the handle 35 is in alignment with the securing cylinder 115. A pair of fasteners 60 passes through the securing holes 137 and 335 respectively to fasten the ATX carrying bracket 30 to the chassis 10. A fastener 70 passes through the securing hole 351 of the handle and into the securing cylinder 115 to further fasten the ATX carrying bracket 30 in the chassis 10. Then the ATX carrying bracket 30 and the chassis 10 together form an ATX type computer enclosure.

Figure 4:
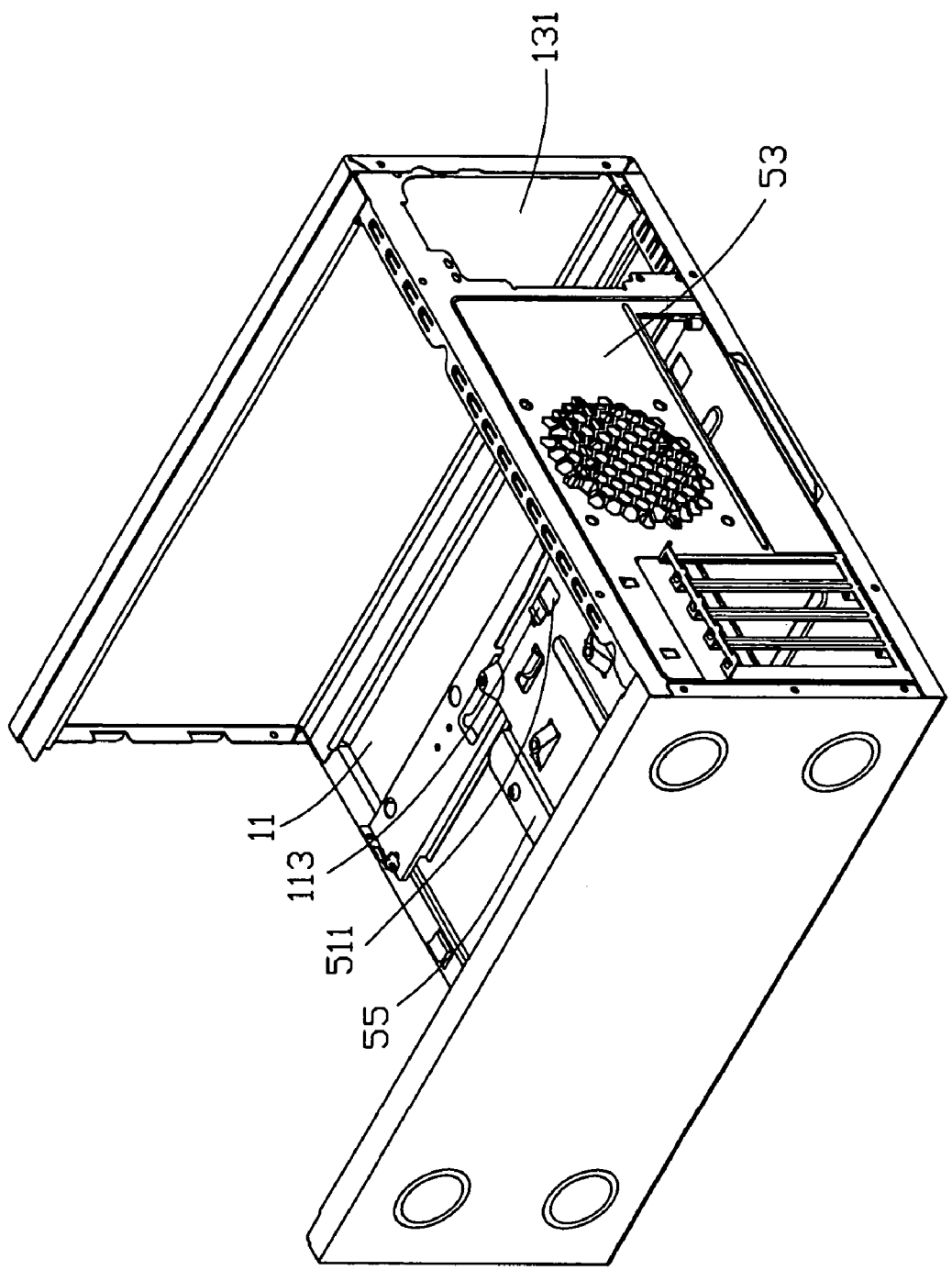
FIG. 4 is an assembled view of the computer enclosure with a BTX carrying bracket.

Referring to FIG. 4, the BTX type carrying bracket 50 is mounted in the chassis 10 in the same manner as the ATX type carrying bracket 30, and form a BTX type computer enclosure together with the chassis 10.

In disassembly, releasing the fasteners 60, 70 first, then holding the handle 35 or 55 to pull the carrying bracket 30 or 50 along the direction opposite to the rear wall 13 of the chassis 10. The securing members 113 of the chassis 10 disengage from the securing holes 311 or 511 of the carrying bracket 30 or 50, thereby allowing removal of the carrying bracket 30 or 50 from the chassis 10.

In other embodiments a plurality of securing means may be formed in a computer enclosure allowing other configurations for the carrying brackets. For example, there can be a securing means on one sidewall for receiving the ATX type carrying bracket 30 and another securing means on another sidewall for receiving the BTX type carrying bracket 50. When users need to replace their motherboard with another type, they need only replace the current carrying bracket with the needed ATX or BTX type carrying bracket in the chassis 10.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A computer enclosure comprising:
a chassis comprising a bottom wall and a rear wall defining at least an opening; and
a carrying bracket comprising a base wall mounted on the bottom wall of the chassis, a bar, and a side wall perpendicular to the base wall, the base wall of the carrying bracket mounted on the bottom wall of the chassis, the base wall being configured to support a motherboard, the side wall of the carrying bracket defining a plurality of outside-communicable interfaces compatible with a standard for the motherboard, the interfaces of the side wall of the carrying bracket coupled to the at least one opening of the chassis, the bar inclined relative to the base wall and the side wall connected between the base wall and the side wall of the carrying bracket and configured for strengthening the carrying bracket.

2. The computer enclosure as claimed in claim 1, wherein at least a securing member is formed in the bottom wall of the chassis, and the base wall of the carrying bracket defines at least a securing opening for the securing member engaging therewith.

3. The computer enclosure as claimed in claim 2, further comprising at least a beam disposed on the bottom wall, and the securing member formed on the beam.

4. The computer enclosure as claimed in claim 1, wherein a flange respectively extends from a side edge of the base wall and the side wall of the carrying bracket, and the bar is connected between the flanges.

5. The computer enclosure as claimed in claim 1, wherein a handle extends from an edge opposite to the side wall of the carrying bracket.

6. The computer enclosure as claimed in claim 5, wherein a securing cylinder with a screw hole protrudes from the bottom wall of the chassis, and the handle defines a securing hole corresponding to the screw hole of the securing cylinder.

7. The computer enclosure as claimed in claim 5, wherein a fastener passes through the securing hole of the handle and the screw hole of the securing cylinder to mount the carrying bracket in the chassis.

8. The computer enclosure as claimed in claim 1, wherein a flange respectively extends from an upper edge of the opening and a top edge of the carrying bracket, and each flange defines at least a securing hole in correspondence with each other.

9. The computer enclosure as claimed in claim 8, wherein a fastener passes through the securing holes to fasten the carrying bracket to the chassis.

10. The computer enclosure as claimed in claim 1, wherein the carrying bracket can be replaced with a different type carrying bracket.

11. A computer enclosure comprising:
a chassis defining an opening; and
a carrying bracket mounted in the chassis, the carrying bracket comprising a base wall configured to support a motherboard, a bar, and a side wall perpendicular to the base wall, the side wall of the carrying bracket coupled to the opening of the chassis to form a rear panel of the chassis, the bar inclined relative to the base wall and the side wall connected between the base wall and the side wall of the carrying bracket and configured for strengthening the carrying bracket.

12. The computer enclosure as claimed in claim 11, wherein the chassis further comprises a bottom wall forming a plurality of securing members therein, and a plurality of securing openings is defined in the base wall of the carrying bracket for the securing members engaging therein.

13. The computer enclosure as claimed in claim 11, wherein a securing cylinder with a screw hole protrudes from the bottom wall of the chassis.

14. The computer enclosure as claimed in claim 13, wherein a handle extends from an edge opposite to the side wall of the carrying bracket, and the handle defines a securing hole corresponding to the screw hole of the securing cylinder.

15. The computer enclosure as claimed in claim 14, wherein a fastener passes through the securing hole of the handle and the screw hole of the securing cylinder to mount the carrying bracket in the chassis.

16. An electronic device comprising:
a chassis of said electronic device defining a space therein for accommodation of motherboards; and
a selective one of at least two carrying brackets replaceably installable in said chassis, each of said at least two carrying bracket comprising a base wall capable of carrying one motherboard of said motherboards compatible with a standard different from another motherboard to be installed in said space of said chassis, and providing a side wall thereof exposable out of said chassis to define an outside-communicable interface compatible with said standard for said motherboard, each carrying bracket comprising a bar inclined relative to the side wall connected between the base wall and the side wall of the carrying bracket and configured for strengthening the carrying bracket.

17. The electronic device as claimed in claim 16, wherein said standard compatible by said component capable of being carried by said each of said at least two carrying bracket is selected from the group consisting of Advanced Technology Extended (AIX) standard and Balanced Technology Extended (BIX) standard.

18. The electronic device as claimed in claim 16, wherein said chassis comprises a bottom wall forming a plurality of securing members therein, and a plurality of securing openings is defined in said base wall of each carrying bracket for said securing members engaging therein.

* * * * *

UNITED STATES PATENT AND TRADEMARK OFFICE
CERTIFICATE OF CORRECTION

PATENT NO. : 7,639,505 B2 Page 1 of 1
APPLICATION NO. : 11/313408
DATED : December 29, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this

Ninth Day of November, 2010

David J. Kappos
*Director of the United States Patent and Trademark Office*